US009392719B1

(12) United States Patent
Chen et al.

(10) Patent No.: US 9,392,719 B1
(45) Date of Patent: Jul. 12, 2016

(54) SURROUNDING-BUCKLE TYPE MOBILE HARD DRIVE RACK

(71) Applicant: Super Micro Computer Inc., San Jose, CA (US)

(72) Inventors: Richard S. Chen, San Jose, CA (US); Ken-Sheng Lin, San Jose, CA (US); Chia-Cheng Lu, San Jose, CA (US)

(73) Assignee: SUPER MICRO COMPUTER INC., San Jose, CA (US)

( * ) Notice: Subject to any disclaimer, the term of this patent is extended or adjusted under 35 U.S.C. 154(b) by 0 days.

(21) Appl. No.: 14/681,466

(22) Filed: Apr. 8, 2015

(51) Int. Cl.
*A47F 5/00* (2006.01)
*H05K 7/14* (2006.01)
*F16B 2/10* (2006.01)

(52) U.S. Cl.
CPC .............. *H05K 7/1417* (2013.01); *F16B 2/10* (2013.01)

(58) Field of Classification Search
CPC ... H05K 7/1417; H05K 5/0217; G11B 33/14; G11B 33/124; G11B 33/125; G06F 1/187; G06F 1/1658
USPC ........................................ 361/679.33, 679.37
See application file for complete search history.

(56) References Cited

U.S. PATENT DOCUMENTS

| | | | | |
|---|---|---|---|---|
| 7,609,511 B2* | 10/2009 | Peng | ................... | G11B 33/128 248/633 |
| 8,749,966 B1* | 6/2014 | Boudreau | ............... | G06F 1/187 361/679.33 |
| 8,873,232 B2* | 10/2014 | Tsai | ........................ | G06F 1/187 312/223.2 |
| 9,274,571 B2* | 3/2016 | Albert | .................... | G06F 1/187 |
| 2009/0103252 A1* | 4/2009 | Peng | .................... | G11B 33/124 361/679.4 |
| 2009/0129009 A1* | 5/2009 | Zhang | .................... | G11B 33/12 361/679.34 |
| 2013/0099640 A1* | 4/2013 | Hu | ........................ | G11B 33/124 312/223.2 |
| 2015/0313028 A1* | 10/2015 | Bell | ......................... | F16F 3/12 361/679.35 |

* cited by examiner

*Primary Examiner* — Christopher E Garft
(74) *Attorney, Agent, or Firm* — Chun-Ming Shih; HDLS IPR Services (57) ABSTRACT

A hard drive rack includes a frame and a buckle arm. The frame includes a plurality of plates and at least one insertion opening. A buckle trough is formed on the plates at a side of the insertion opening. The plates include a bottom plate, a cover plate, and a supporting plate. The buckle arm is pivotally connected to a side of the frame and one end thereof is able to pivotally rotate through pivotally connecting to the frame. The other end of the buckle arm is formed with an elastic insertion plate which is selectively blocked by the buckle trough to be inserted into the insertion opening.

11 Claims, 9 Drawing Sheets

SURROUNDING-BUCKLE TYPE MOBILE HARD DRIVE RACK

BACKGROUND

1. Technical Field

The technical field relates to a hard drive rack, particularly to a surrounding-buckle type mobile hard drive rack.

2. Related Art

With the prevalence of internet and e-commerce, using server with plenty of storage devices (ex. hard drives) to store the backup data has been a common solution for the public.

Nowadays, most of the array storage devices use removable type hard drive. However, screws are essential in most of the fastening means for the conventional hard drive tray, and the hard drive tray is further fixed to the server case by hand tools. Similarly, when removing the hard drive, hand tools are required as well. It is time consuming using hand tools if too many hard drives need to be replaced frequently. Thus, in order to increase the amount of the hard drive to store more electronic information while not taking too much spaces and costing too much, a new mobile hard drive accommodation device is necessary.

BRIEF SUMMARY

The purpose of a preferred embodiment of the present invention is to provide a surrounding-buckle type mobile hard drive rack, which fixes the hard drive into the rack by surroundingly buckling the frames and the buckle arm, and the user can easily replace the hard drive without using any tools, so as to achieve the goal of quick assembling and disassembling.

In order to achieve the aforementioned purpose, a preferred embodiment of the present invention provides a surrounding-buckle type mobile hard drive rack, which includes a frame and a buckle arm. The frame includes a plurality of plates, an accommodation space and at least one insertion opening surrounded by the plurality of plates. A buckle trough is formed on the plurality of plates on a side of the insertion opening. The plurality of plates includes a bottom plate, a cover plate, and a supporting plate connecting the bottom plate and the cover plate. The buckle arm pivotally connected to a side of the frame. The buckle arm is provided with a pivotal end and an insertion end, the buckle arm is pivotally connected to the frame through the pivotal end to be able to rotate. An elastic insertion plate is formed on the insertion end and selectively connected to the insertion opening by blocking with the buckle trough.

Another purpose of the preferred embodiment of the present invention is to provide a surrounding-buckle type mobile hard drive rack, and the frame is designed as pierced frame which is good for ventilation, thereby improving the heat dissipating efficiency.

Compared to the conventional technique, the frame of the surrounding-buckle type mobile hard drive rack according to the preferred embodiment of the present invention has an insertion opening and movably connects to the buckle arm. The main embodiment of the present invention provides a buckle trough on the cover plate, and provides an elastic insertion plate on the pivotable buckle arm. The buckle arm connects the frame via the elastic insertion plate and closes the insertion opening of the frame. As such, the frame and the buckle arm can fix the hard drive in the rack by a surrounding-buckle means. On the other hand, the users do not need to use any tools, and the hard drive can be easily removed from the frame after the buckle arm disconnects from the frame, so as to achieve the goal of quick assembling and improve the convenience and practicability in using.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
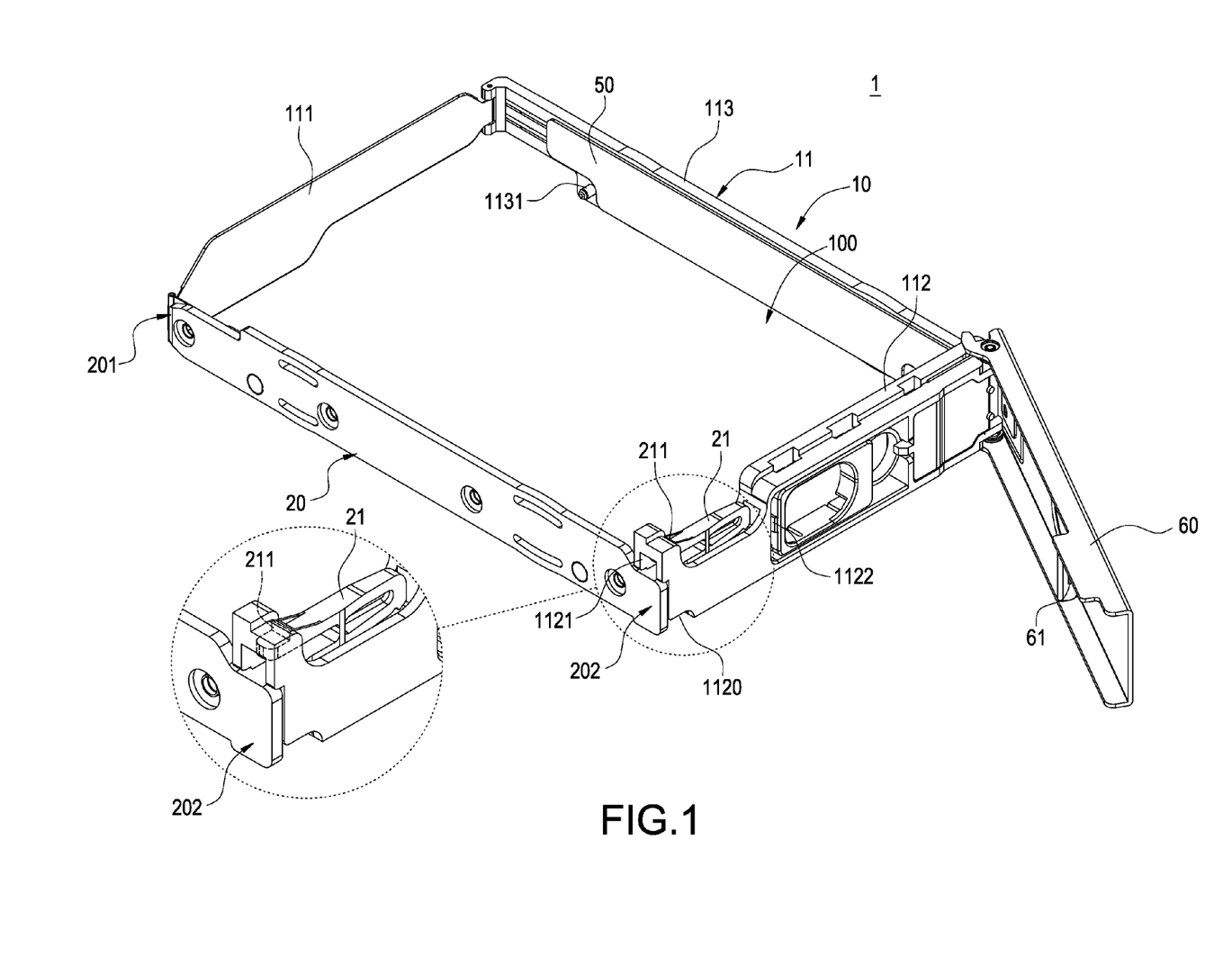
FIG. 1 is a three-dimensional schematic view of a preferred embodiment of the surrounding-buckle type mobile hard drive rack according to the present invention.
Figure 2:
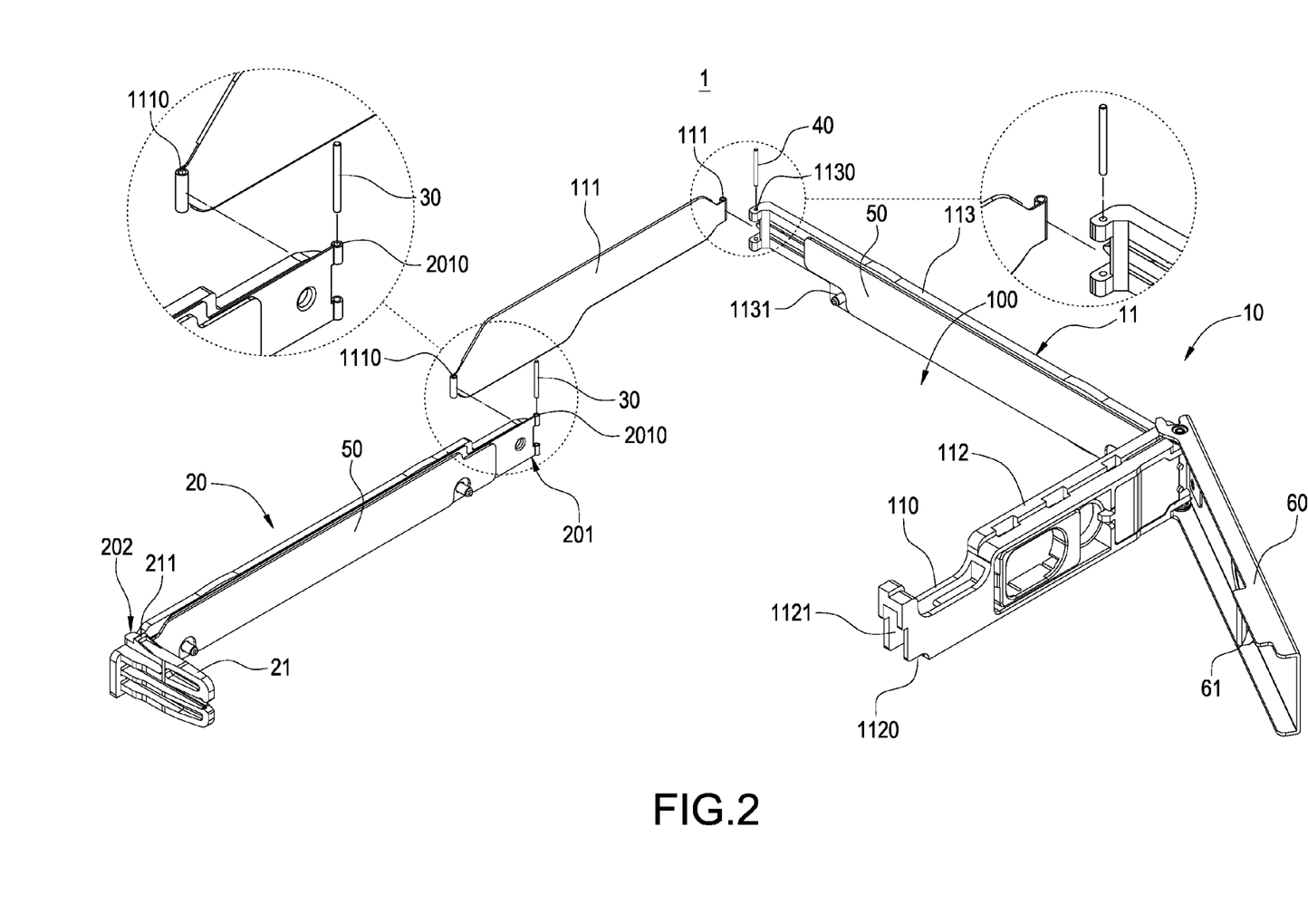
FIG. 2 is a three-dimensional exploded schematic view of a preferred embodiment of the surrounding-buckle type mobile hard drive rack according to the present invention.
Figure 3:
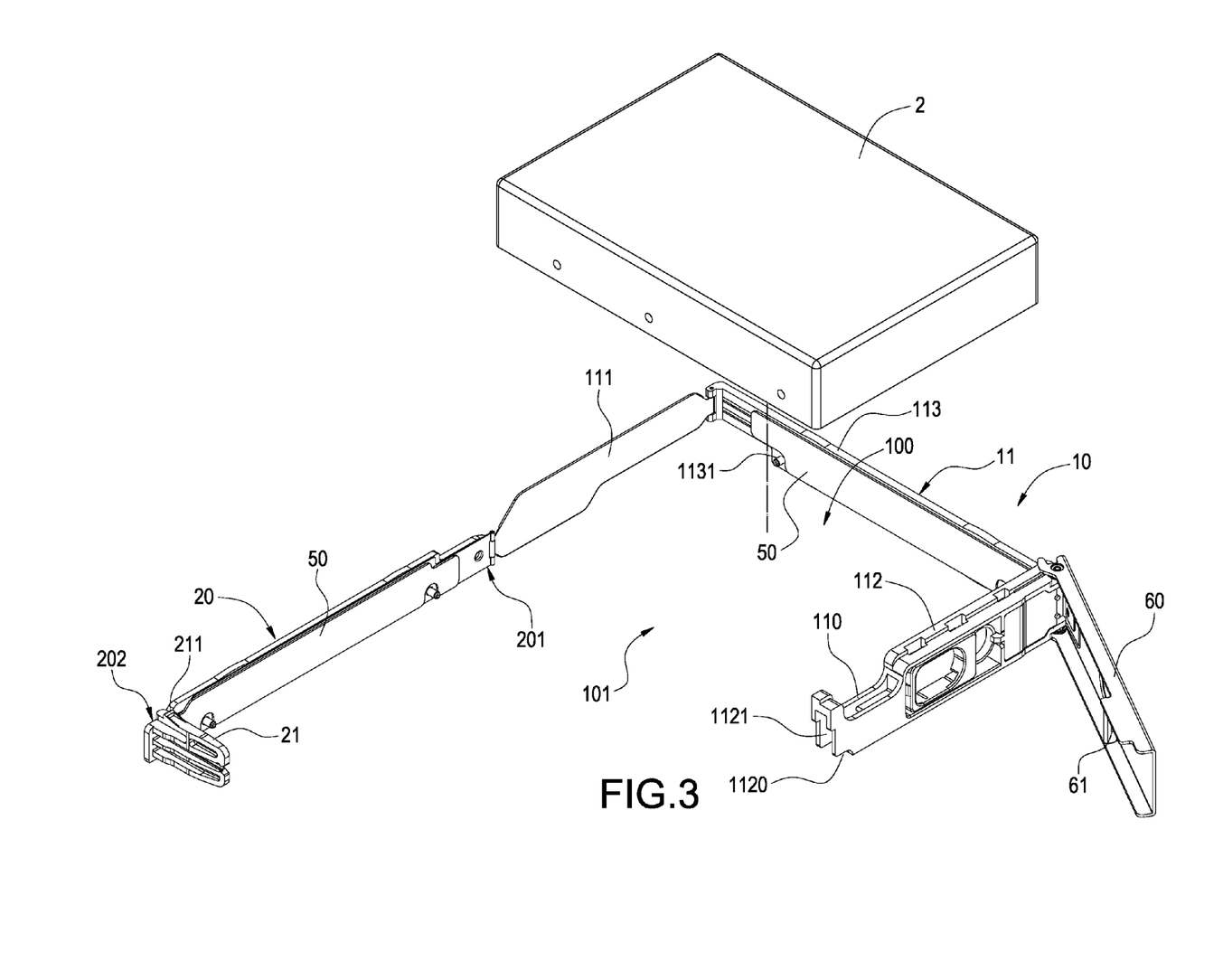
FIG. 3 is a schematic view of a preferred embodiment of the surrounding-buckle type mobile hard drive rack after assembling with the hard drive according to the present invention.

Referring to FIGS. 1 to 3, the surrounding-buckle type mobile hard drive rack 1 according to the preferred embodiment of the present invention is used for holding a hard drive 2. The surrounding-buckle type mobile hard drive rack 1 includes a frame 10 and a buckle arm 20. The buckle arm 20 is pivotally connected to the frame 10 and is able to rotate to open or close relative to the frame 10.

The frame 10 includes a plurality of plates 11, the plates 11 surround to from an accommodation space 100 and at least one insertion opening 101. A buckle trough 110 is formed on the plates 11 at a side of the insertion opening 101. In a preferred embodiment of the present invention, at least one side of the accommodation space 100 is the insertion opening 101.

In a preferred embodiment of the present invention, the frame 10 is a rectangle frame. The plates 11 include a bottom plate 111 and a cover plate 112 disposed on opposite sides of the accommodation space 100, and a supporting plate 113 connecting the bottom plate 111 and the cover plate 112. Preferably, the bottom plate 111 and the cover plate 112 are pivotally connected to both ends of the supporting plate 113, respectively. The bottom plate 111 and the cover plate 112 can pivotally rotate along the supporting plate 113. As such, the bottom plate 111, the cover plate 112 and the supporting plate 113 can pivotally rotate among one another, and the frame 10 can expand to form as a straight frame, which is convenient for storing and save the storage space.

A buckle arm 20 is pivotally connected to a side of the frame 10, the buckle arm 20 is provided with a pivotal end 201 and an insertion end 202. The buckle arm 20 is pivotally connected to the frame 10 through the pivotal end 201 to be able to rotate. An elastic insertion plate 21 is formed on the insertion end 202 and selectively connected to the insertion opening 101 by blocking with the buckle trough 110 of the frame 10. More detailed illustration will be shown as follows.

In a preferred embodiment of the present invention, the surrounding-buckle type mobile hard drive rack 1 further includes a first shaft 30 and a second shaft 40. The pivotal end 201 of the buckle arm 20 is provided with a first through hole 2010. A first shaft hole 1110 is provided on the bottom plate 111 on a side adjacent to the buckle arm 20. The buckle arm 20 is able to pivotally rotate relative to the bottom plate 111 by the first shaft 30 penetrating through the first through hole 2010 and the first shaft hole 1110. Also, one end of the supporting plate 113 is provided with a second through hole 1130, and a second shaft hole 1111 is provided on the bottom plate 111 at a side adjacent to the supporting plate 113. The second shaft 40 penetrates through and is inserted into the second through hole 1130 and the second shaft hole 1111. As such, the buckle arm 20, the bottom plate 111 and the supporting plate 113 can pivotally rotate among one another. It is noteworthy that, the pivotal structure among the buckle arm 20, the bottom plate 111 and the supporting plate 113 is not limited to the embodiment as described above, and other equivalent structure having the pivotally rotation function can also be applied to the preferred embodiment of the present invention.

Besides, the surrounding-buckle type mobile hard drive rack 1 further includes a plurality of cushions 50. The cushions 50 are attached to the supporting plate 113 and the buckle arm 20 at sides facing he accommodation space. The cushions 50 can absorb shocks for the hard drive 2 in the accommodation space, thereby preventing the hard drive 2 from damage due to collisions.

The buckle trough 110 of the frame 10 is disposed on a side of the cover plate 112. Besides, a notch 1120 for finger inserting therein is provided on the cover plate 112 at a side opposite to the buckle trough 110. Besides, an insertion slot 1121 communicating with the buckle trough 110 is provided on a side of the cover plate 112. The elastic insertion plate 21 of the buckle arm 20 is formed with a blocking element 211. When the elastic insertion plate 21 penetrates through the insertion slot 1121 of the cover plate 112 to be inserted into the buckle trough 110, the blocking element 211 blocks against a side of the buckle trough 110, and the buckle arm 20 can be positioned into the insertion slot 1121 to connect the frame 10 by the elastic insertion plate 21, so as to surround and close the insertion opening 101 of the frame 10. By this arrangement, the frame 10 and the buckle 20 can fix the hard drive 2 into the rack by surrounding buckle means. On the other hand, when the buckle 20 disconnects from the buckling of the frame 10, the users do not need to use any tools to remove the hard drive 2 from the frame 10, thereby achieving the goal of quick assembling/disassembling.

Figure 4:
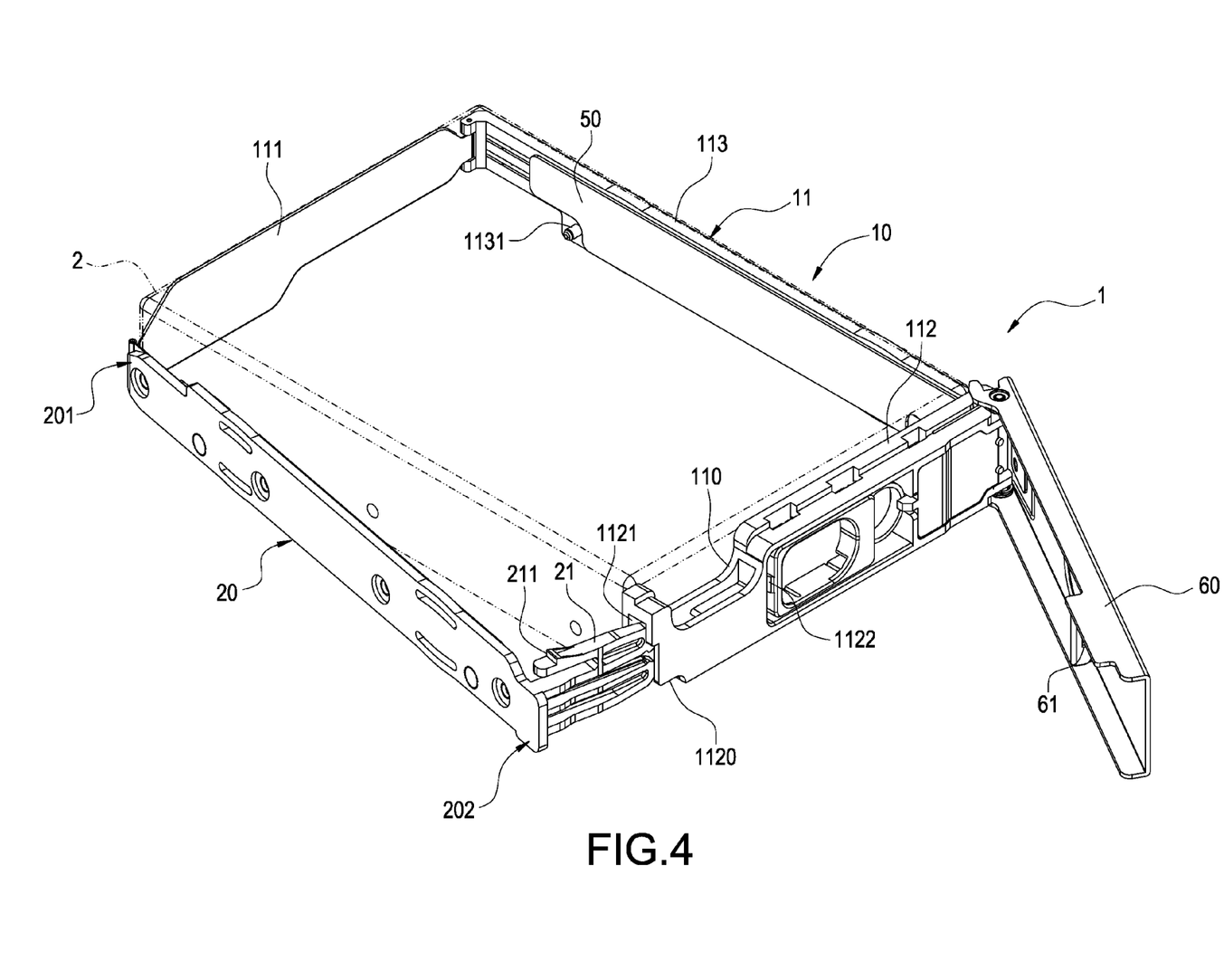
FIG. 4 is a three-dimensional buckling schematic view of a preferred embodiment of the surrounding-buckle type mobile hard drive rack according to the present invention.
Figure 5:
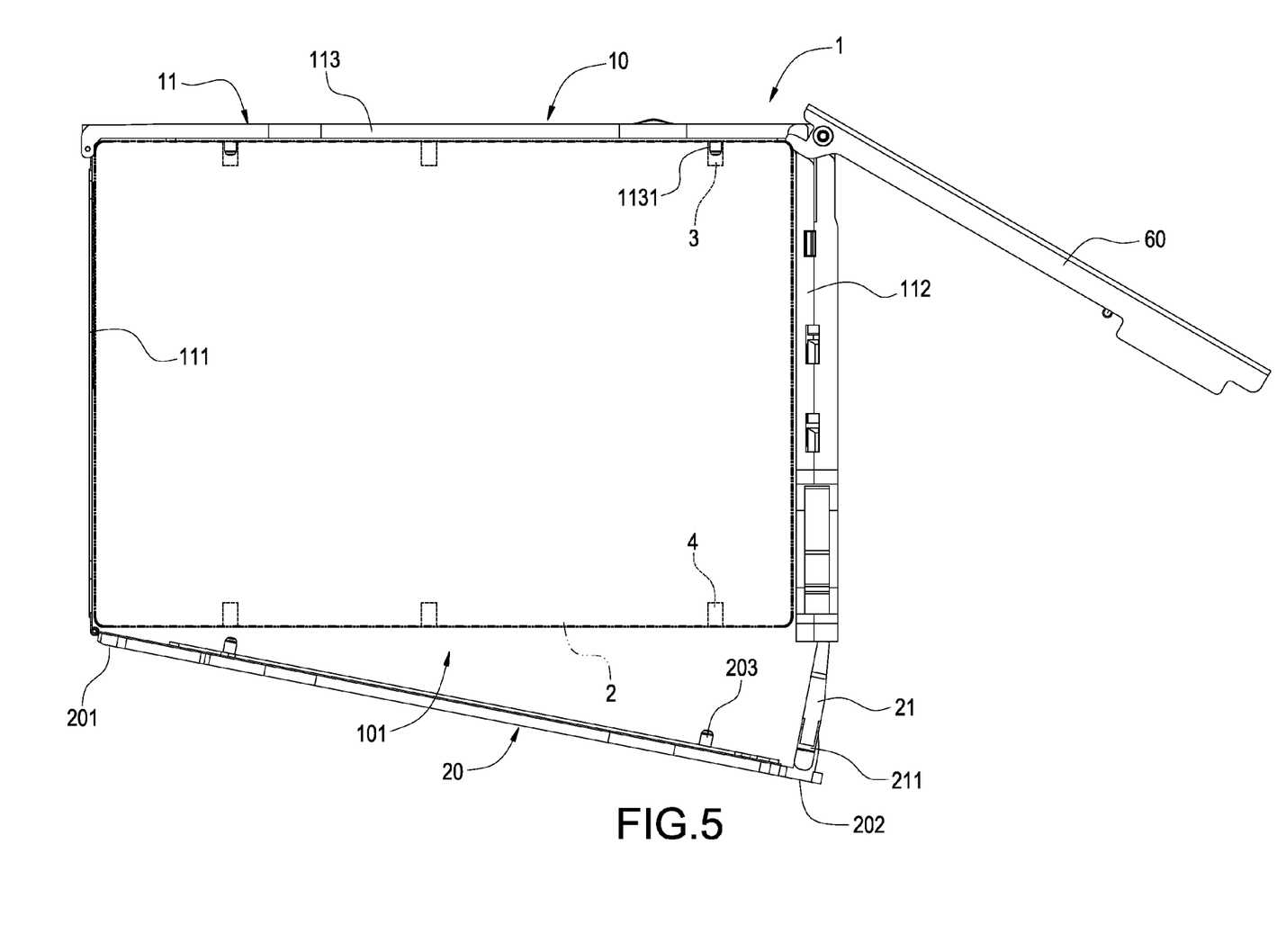
FIG. 5 is a top buckling schematic view of a preferred embodiment of the surrounding-buckle type mobile hard drive rack according to the present invention.
Figure 6:
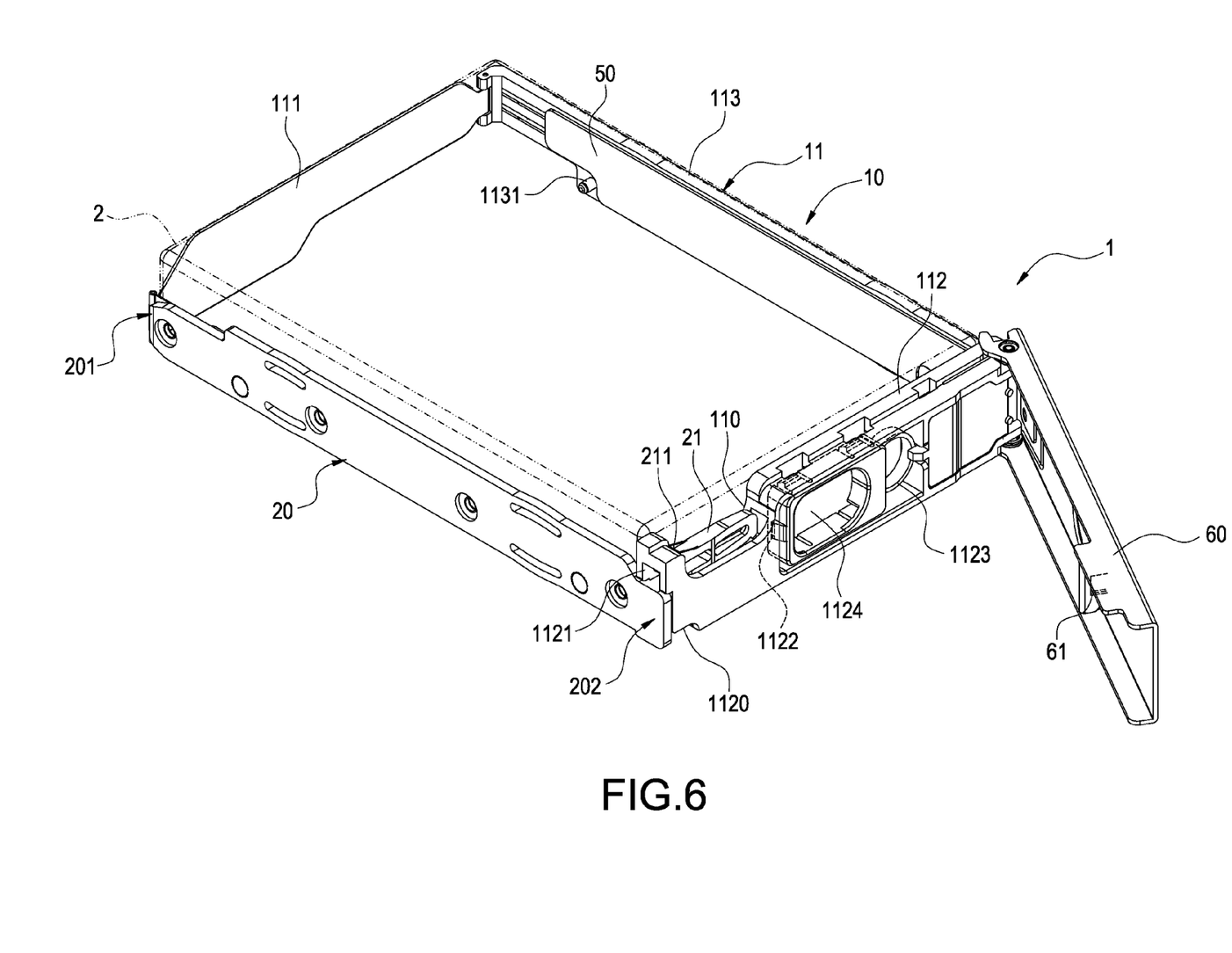
FIG. 6 is a three-dimensional schematic view of a preferred embodiment of the surrounding-buckle type mobile hard drive rack after buckling up according to the present invention.
Figure 7:
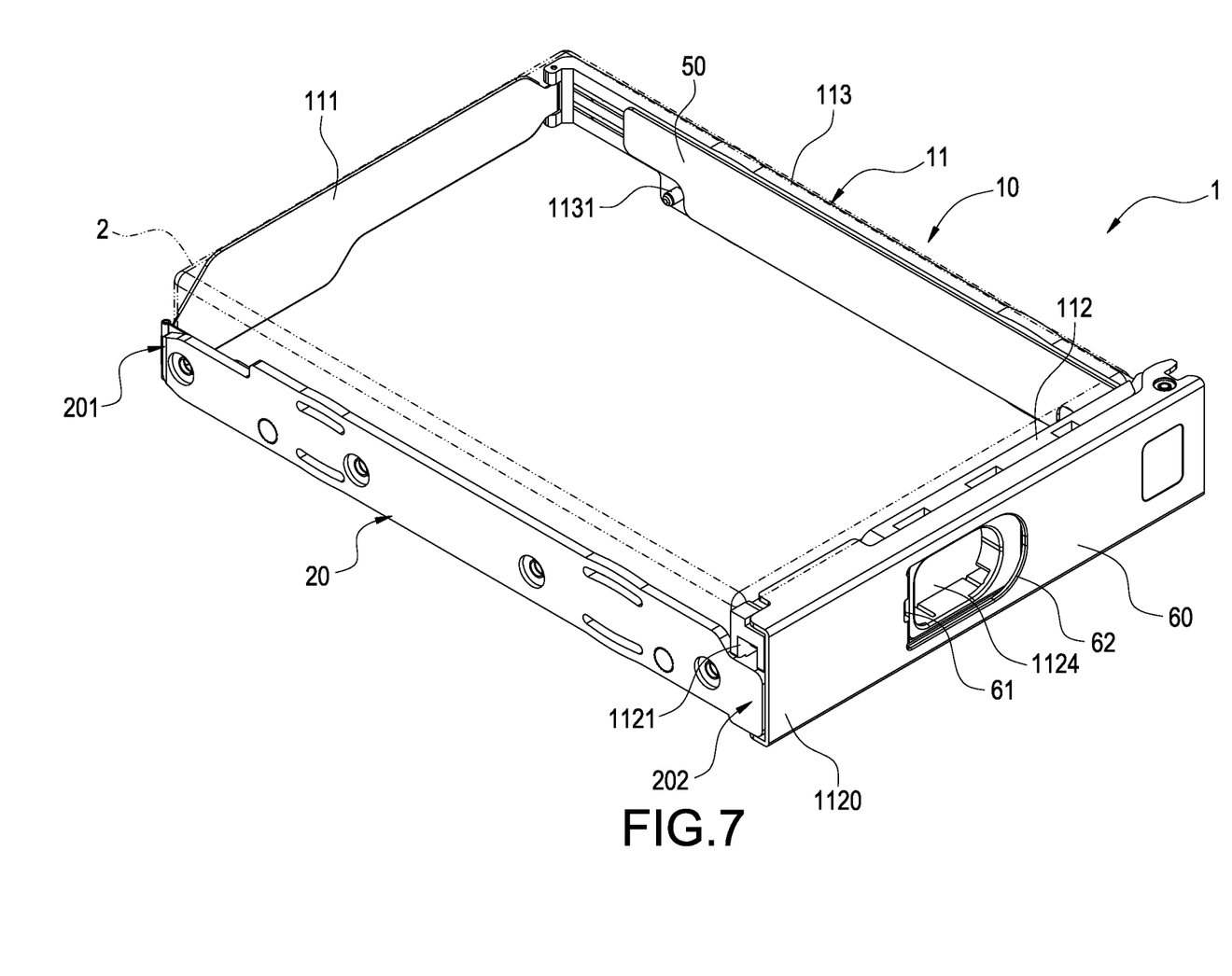
FIG. 7 is a three-dimensional schematic view of a preferred embodiment of the surrounding-buckle type mobile hard drive rack after the pulling handle covering thereof according to the present invention.

Referring to FIGS. 4 and 5, when using the surrounding-buckle type mobile hard drive rack 1, the frame 10 needs to be expanded back to rectangle shape, and the hard drive 2 is inserted into the accommodation space 100 of the frame 10 from the insertion opening 101. And then, rotating the buckle arm 20 to close the insertion opening 101, and the elastic insertion plate 21 of the buckle arm 20 penetrates through the insertion slot 1121 of the cover plate 112 into the buckle trough 110. The blocking element 211 of the elastic insertion plate 21 will block against one side of the buckle trough 110. Thus, the elastic insertion plate 21 will be buckled to the buckle trough 110, and the hard drive 2 can be positioned into the accommodation space 100 surrounded by the frame 10 and the buckle arm 20.

It is noteworthy that, the accommodation space 100 is a pierced compartment, the hard drive 2 is accommodated into the accommodation space 100 to fully expose two opposite side surfaces. Since the frame 10 of the preferred embodiment of the present invention is a pierced frame, the thickness of the surrounding-buckle type mobile hard drive rack 1 can be reduced when the hard drive 2 is accommodated into the accommodation space 100, thereby allowing more surrounding-buckle type mobile hard drive racks 1 to be accommodated in the inner space of the server. Besides, since the frame 10 of the preferred embodiment of the present invention is a pierced frame which is good for ventilation, the heat dissipation efficiency of the hard drive 2 can be improved as well.

Referring to FIG. 5, in the preferred embodiment of the present invention, one side of the hard drive 2 is provided with a first positioning hole 3, and a first positioning pin 1131 is provided on the supporting plate 113 on a side facing the hard drive 2. The hard drive 2 is positioned into the accommodation space 100 by the interconnection of the first positioning pin 1131 and the first positioning hole 3. Preferably, the other side of the hard drive 2 is provided with a second positioning hole 4, and a second positioning pin 203 is provided on the buckle arm 20 on a side facing the hard drive 2. The hard drive 2 is more firmly positioned into the accommodation space 100 by the interconnection of the second positioning pin 203 and the second positioning hole 4.

Preferably, the first positioning pin 1131 and the second positioning pin 203 are metal posts. Besides, the buckle arm 20 and the supporting plate 113 are metal plates. Thus, when the hard drive 2 is accommodated into the accommodation space 100, the positioning of the first positioning pin 1131 and the first positioning hole 3, and the positioning of the second positioning pin 203 and the second positioning hole 4 can both provide grounding function.

Referring to FIGS. 6 to 9, the surrounding-buckle type mobile hard drive rack 1 further includes a pulling handle 60. The users can apply force on the pulling handle 60 to pull out the surrounding-buckle type mobile hard drive rack 1 from a server case.

The pulling handle 60 is provided with a first buckle part 61, and the cover plate 112 is correspondingly provided with a second buckle part 1122. The pulling handle 60 covers the cover plate 112 on a side away from the accommodation space 100 by the interconnection of the first buckle part 61 and the second buckle part 1122. In the present embodiment, the first buckle part 61 is a Mister, and the second buckle part 1122 is a bump, but not limited thereto.

In a preferred embodiment of the present invention, the cover plate 112 is provided with an elastic pressing ring 1123. The elastic pressing ring 1123 deforms under an outer force and forces the second buckle part 1122 to unbuckle the first buckle part 61. Besides, a pressing hole 1124 is provided on the cover plate 112 at the same side of the elastic pressing ring 1123. Moreover, the pulling handle 60 is correspondingly provided with an opening 62 lager than the pressing hole 1124.

Figure 8:
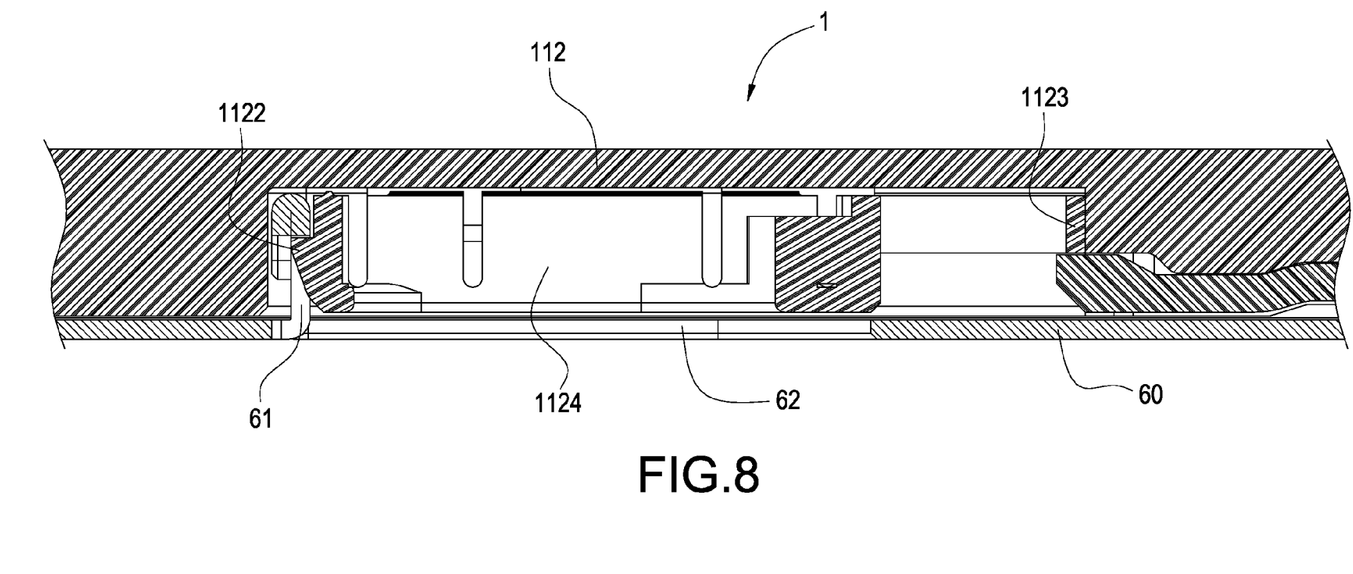
FIG. 8 is a partial and sectional view of a preferred embodiment of the surrounding-buckle type mobile hard drive rack after the pulling handle covering thereof according to the present invention.

As embodied in FIG. 8, when a hard drive 2 is replaced or removed from the surrounding-buckle type mobile hard drive rack 1, the pulling handle 60 needs to be pulled outward. When in use, the outer force reaches the opening 62 and the pressing hole 1124 to further push the elastic pressing ring 1123, thereby forcing the first buckle part 61 to unbuckle with the second buckle part 1122 to release the pulling handle 60. At last, users can use single hand to press the elastic insertion plate 21 in the buckle trough 110 to force the elastic insertion plate 21 to deform. Meanwhile, the deformation of the elastic insertion plate 21 can enable the blocking element 211 to disengage from the buckle trough 110. As such, the buckle arm 20 is unbuckled from the cover plate 112 and rotates to a side to expose the insertion opening 101 (as shown in FIG. 3), thereby removing the hard drive 2.

Figure 9:
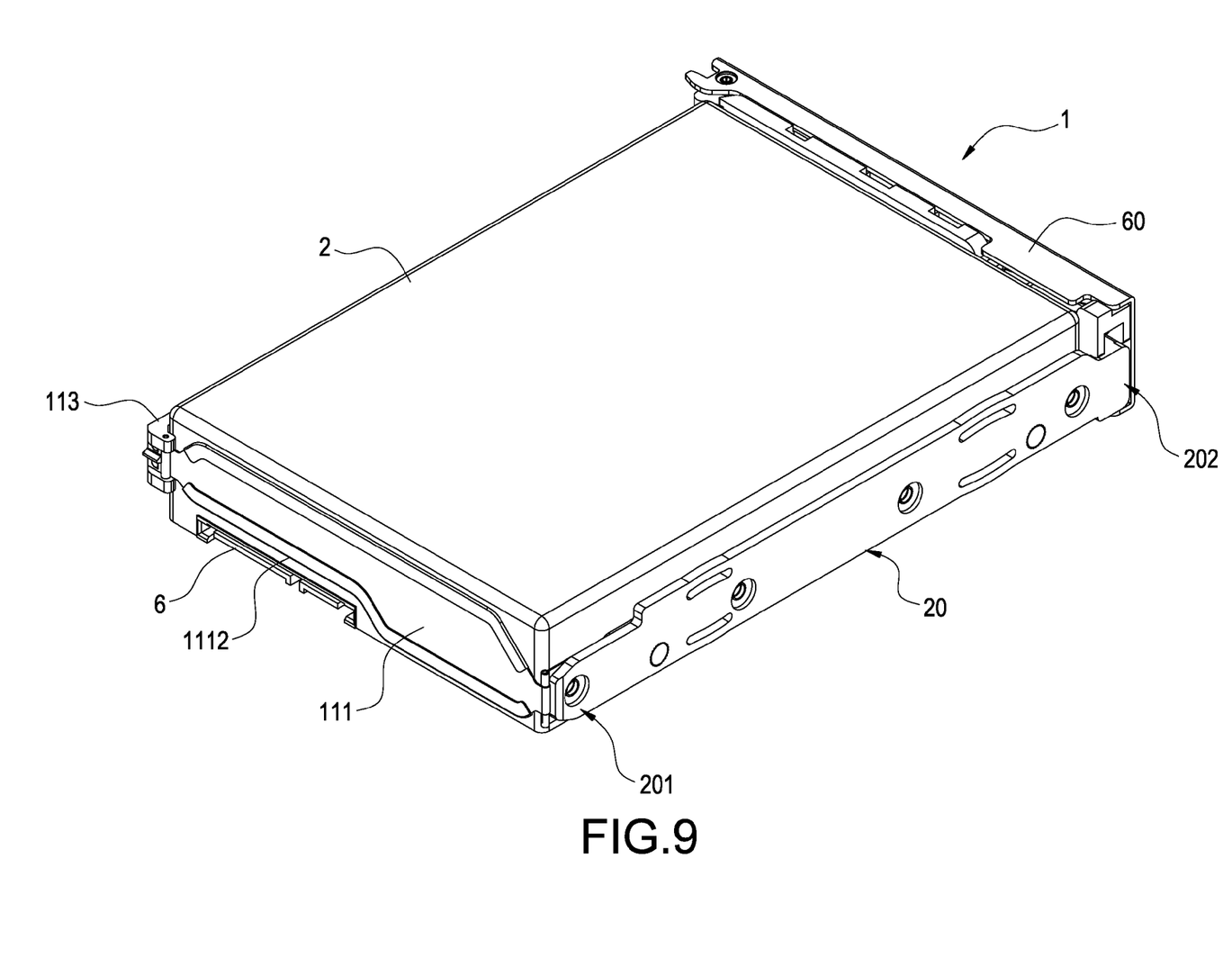
FIG. 9 is a three-dimensional schematic view of a preferred embodiment of another side of the surrounding-buckle type mobile hard drive rack according to the present invention.

Furthermore, referring to FIG. 9, when the hard drive 2 is combined with a connector 5 (ex. eSATA), one side of the bottom plate 111 corresponding to the connector 5 is formed with an accommodation trough 1112. By this arrangement, the surrounding-buckle type mobile hard drive rack 1 can accommodate hard drives 2 with different specification, and thus improving the practicability of the present invention.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A surrounding-buckle type mobile hard drive rack for accommodating a hard drive, comprising:
    a frame including a plurality of plates, an accommodation space and at least one insertion opening being surrounded by the plurality of plates, a buckle trough being formed on the plurality of plates on a side of the insertion opening, the plurality of plates including a bottom plate and a cover plate disposed on opposite sides of the accommodation space, and a supporting plate connecting the bottom plate and the cover plate;
    a pulling handle, the pulling handle being provided with a first buckle part, the cover plate being provided with a second buckle part, the pulling handle movably covering the cover plate on a side away from the accommodation space by an interconnection of the first buckle part and the second buckle part; and
    a buckle arm pivotally connected to a side of the frame, the buckle arm being provided with a pivotal end and an insertion end, the buckle arm pivotally connected to the frame through the pivotal end to be able to rotate, an elastic insertion plate being formed on the insertion end and selectively connected to the the cover plate by blocking with the buckle trough.

2. The hard drive rack according to claim 1, wherein the bottom plate is pivotally connected to one end of the supporting plate, the bottom plate pivotally rotates with respect to the supporting plate.

3. The hard drive rack according to claim 1, wherein one side of the bottom plate corresponding to a connector is formed with an accommodation trough.

4. The hard drive rack according to claim 1, further comprising a first shaft, the pivotal end of the buckle arm being provided with a first through hole, a first shaft hole being provided on the bottom plate at one end connected to the buckle arm, the first shaft being inserted into the first through hole and the first shaft hole.

5. The hard drive rack according to claim 1, further comprising a second shaft, one end of the supporting plate being provided with a second through hole, a second shaft hole being provided on the bottom plate at another end connected to the supporting plate, the second shaft being inserted into the second through hole and the second shaft hole.

6. The hard drive rack according to claim 1, wherein a first positioning pin is provided on the supporting plate at a side facing the accommodation space, a second positioning pin is provided on the buckle arm at another side facing the accommodation space.

7. The hard drive rack according to claim 1, wherein the cover plate is provided with an elastic pressing ring, the elastic pressing ring deforms under an outer force to disconnect the second buckle part from the first buckle part.

8. The hard drive rack according to claim 7, wherein a pressing hole is provided on the cover plate at a side where the elastic pressing ring is disposed, an opening larger than the pressing hole is provided on the pulling handle, the outer force is applied to the elastic pressing ring via the opening and the pressing hole.

9. The hard drive rack according to claim 1, wherein the buckle trough is disposed on the cover plate, a side of the cover plate is provided with an insertion slot communicating with the buckle trough, the elastic insertion plate is provided with a blocking element, the elastic insertion plate penetrates through the insertion slot and is inserted into the buckle trough, the blocking element is against a side of the buckle trough.

10. The hard drive rack according to claim 1, wherein the cover plate is provided with a notch at another side opposite to the buckle trough.

11. The hard drive rack according to claim 1 further comprising a plurality of cushions, the plurality of cushions are attached to the supporting plate and the buckle arm at sides facing the accommodation space.

* * * * *